United States Patent [19]

Stewart et al.

[11] 4,404,755

[45] Sep. 20, 1983

[54] FLUIDIZED BED HEAT EXCHANGER UTILIZING INDUCED DIFFUSION AND CIRCULATION

[75] Inventors: Robert D. Stewart, Verona; Robert L. Gamble, Wayne, both of N.J.

[73] Assignee: Foster Wheeler Energy Corporation, Livingston, N.J.

[21] Appl. No.: 296,021

[22] Filed: Aug. 25, 1981

[51] Int. Cl.³ .............................................. F26B 17/10
[52] U.S. Cl. ............................... 34/57 A; 34/57 B; 432/58; 122/4 D
[58] Field of Search ................ 34/57 A, 57 R; 432/15, 432/58; 110/245, 244; 122/4 D

[56] References Cited

U.S. PATENT DOCUMENTS

| | | |
|---|---|---|
| 2,975,037 | 3/1961 | Lake . |
| 3,397,657 | 8/1968 | Tada ................................. 110/245 |
| 3,463,617 | 8/1969 | Takeuchi . |
| 3,818,846 | 6/1974 | Reese . |
| 3,863,577 | 2/1975 | Steever et al. ...................... 432/58 |
| 3,897,739 | 8/1975 | Goldback . |
| 4,035,152 | 7/1977 | Yang et al. . |
| 4,085,707 | 4/1978 | Moss . |
| 4,107,851 | 8/1978 | Takacs et al. . |
| 4,309,829 | 1/1982 | Tesch et al. ...................... 34/57 A |

*Primary Examiner*—Larry I. Schwartz
*Attorney, Agent, or Firm*—Marvin A. Naigur; John E. Wilson; Warren B. Kice

[57] ABSTRACT

A fluidized bed heat exchanger in which a perforated plate is disposed within a housing for supporting a bed of particulate material. Air is passed through the plate to fluidize the particulate material and a mixture of air and additional particulate material is introduced to said bed and deflected into said bed in a manner to induce diffusion and circulation of the bed materials in the bed.

4 Claims, 4 Drawing Figures

FLUIDIZED BED HEAT EXCHANGER UTILIZING INDUCED DIFFUSION AND CIRCULATION

BACKGROUND OF THE INVENTION

This invention relates to a fluidized bed heat exchanger and, more particularly, to a heat exchanger in which heat is generated by the combustion of particulate fuel in a fluidized bed.

The use of fluidized beds has long been recognized as an attractive way of generating heat. In a normal fluidized bed arrangement, air is passed through a perforated plate, or grid, which supports a bed of particulate material, usually including a mixture of fuel material, such as high sulfur bituminous coal, and an adsorbent material for the sulfur released as a result of the combustion of the coal. As a result of the air passing through the bed, the bed behaves like a boiling liquid which promotes the combustion of the fuel. The basic advantages of such an arrangement include relatively high heat transfer rates, substantially uniform bed temperatures, combustion at relatively low temperatures, a reduction in corrosion and boiler fouling and a reduction in boiler size.

In the fluidized bed combustion process, the coal and adsorbent are continuously introduced into the bed by suitable feeders, injectors, or the like and the spent coal and adsorbent are discharged from the lower portion of the bed, usually through a gravity drain pipe extending through a wall of the heat exchanger or through a discharge opening formed through the perforated support plate. However, in these type of arrangements, there is only a minimal number of feeders or injectors, which are usually mounted through the heat exchanger walls, which results in poor distribution and mixing of the particulate material in the bed and therefore a reduced reaction efficiency. This problem is specially acute in connection with the use of particulate coal of high reactivity, such as lignite, and/or relatively fine size particles (smaller than $\frac{1}{8}$ inch), both of which require good mixing and distribution for maximum efficiency.

SUMMARY OF THE INVENTION

It is therefore an object of the present invention to provide a fluidized bed heat exchanger in which an improved mixing and distribution of the bed material in the bed is achieved in a relatively inexpensive and simple manner.

It is a further object of the present invention to provide a fluidized bed heat exchanger of the above type in which the bed material is circulated within the bed utilizing a source of air that is separate from the air used to fluidize the bed.

It is a further object of the present invention to provide a fluidized bed heat exchanger of the above type in which additional bed materials are introduced into the fluidized bed in suspension in air and are directed in a manner to impart momentum to the bed materials and cause circulation of same.

Toward the fulfillment of these and other objects, a mixture of air and particulate material is introduced into the bed in a manner to induce diffusion and circulation of the bed materials within the bed to insure an optimum distribution and mixing of the material.

DESCRIPTION OF THE DRAWINGS

The above brief description, as well as further objects, features and advantages of the present invention will be more fully appreciated by reference to the following detailed description of the present preferred but nonetheless illustrative embodiment in accordance with the present invention when taken in conjunction with the accompanying drawings in which.

DESCRIPTION OF THE PREFERRED EMBODIMENT

Figure 1:
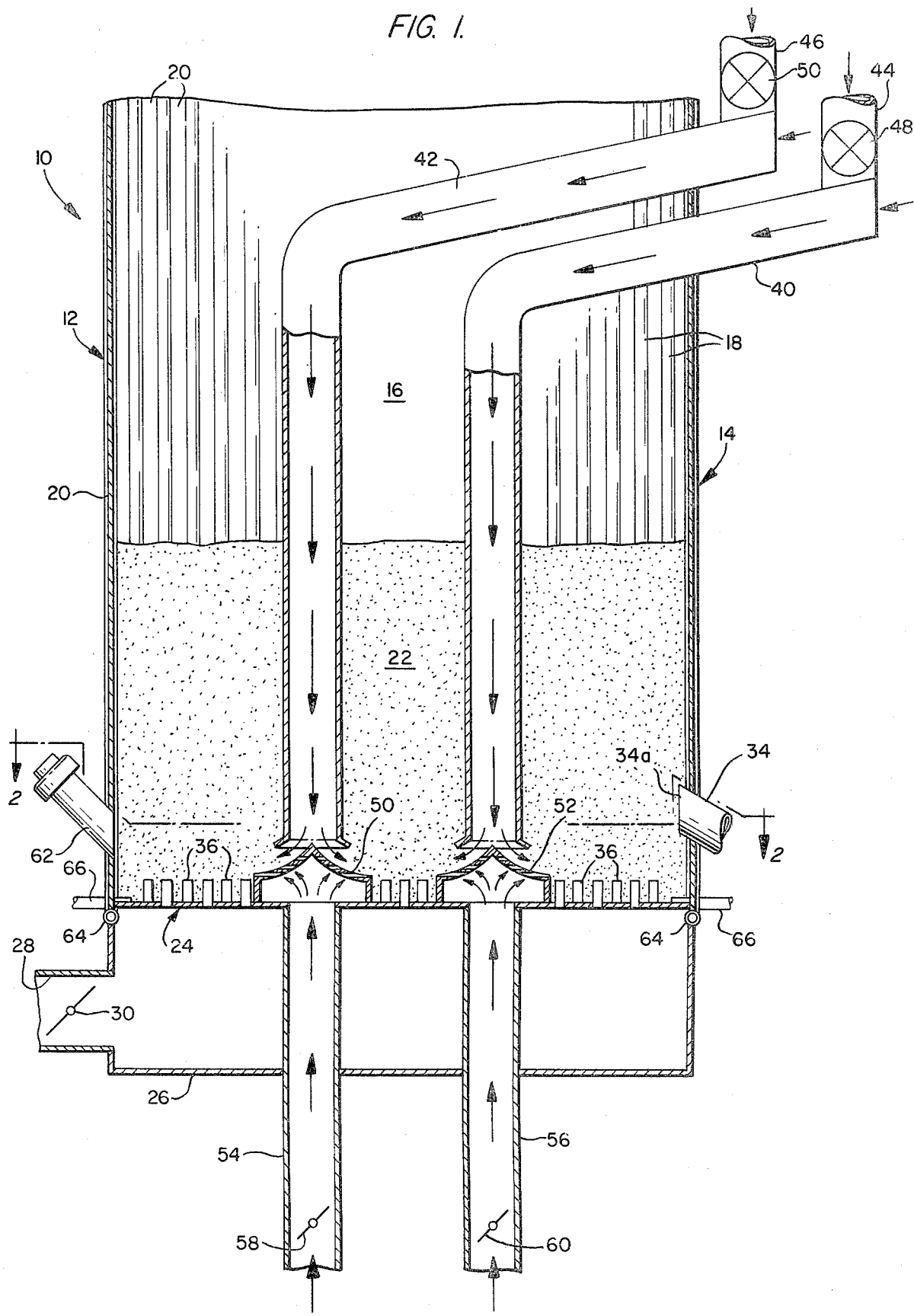
FIG. 1 is a vertical sectional view of an embodiment of the fluidized bed heat exchanger of the present invention.
Figure 2:
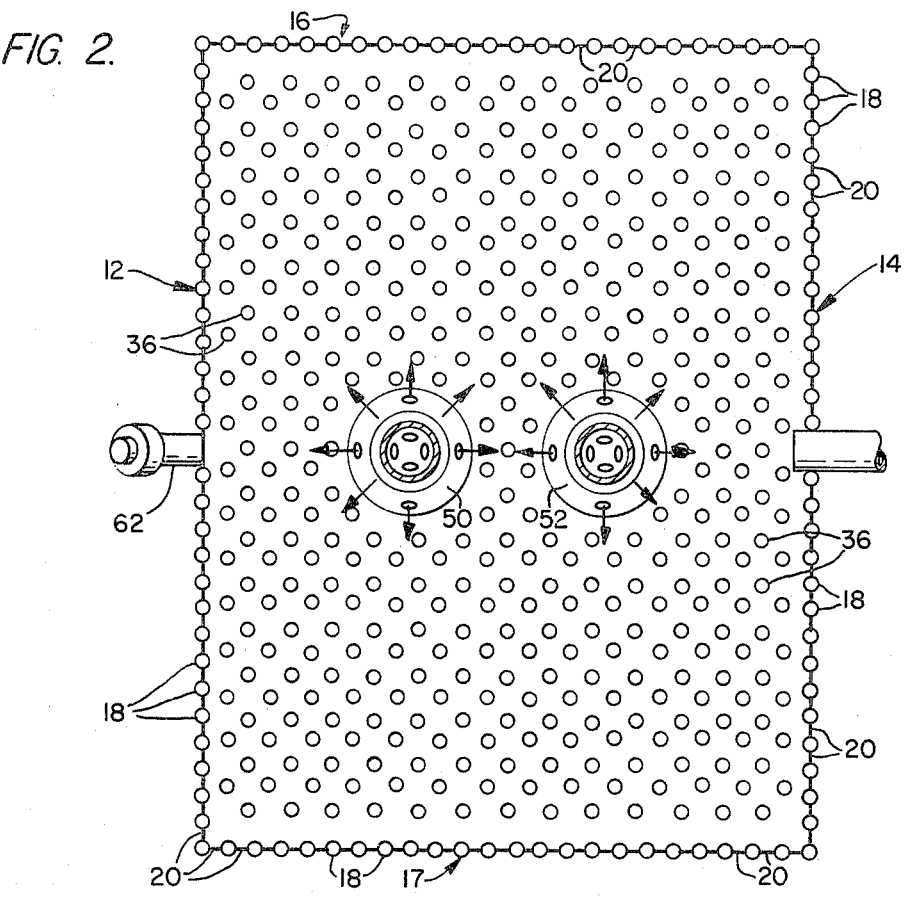
FIG. 2 is a reduced cross-sectional view taken along the line 2—2 of FIG. 1 with the bed material omitted in the interest of clarity.

Referring to FIGS. 1 and 2 of the drawings, the reference numeral 10 refers in general to an enclosure forming a major portion of a fluidized bed heat exchanger which may be in the form of a boiler, a combustor, a process reactor or any similar type device. The enclosure 10 consists of a front wall 12, a rear wall 14, and two sidewalls 16 and 17 respectively. According to the exemplary embodiment shown, each wall is formed by a plurality of vertically-extending tubes 18 disposed in a spaced, parallel relationship and connected together by a plurality of elongated fins 20 extending for the entire lengths of the tubes and connected to diametrically opposed surfaces of the tubes in a conventional manner. The upper portion of the enclosure 10 is not shown for the convenience of presentation, it being understood that it consists of a convection section, a roof and an outlet for allowing the combustion gases to discharge, also in a conventional manner.

A bed of particulate material, shown in general by the reference numeral 22 is disposed within the enclosure 10 and rests on a perforated plate 24 extending horizontally in the lower portion of the enclosure. The bed 22 can consist of a mixture of discrete particles of fuel material such as bituminous coal, and an adsorbent, such as limestone, for adsorbing the sulfur released by the combustion of the fuel material.

An air plenum 26 is provided immediately below the plate 24 and an inlet 28 is provided through the plenum for distributing pressurized air from an external source (not shown) to the plenum under the control of a damper 30.

A drain pipe 34 extends through the wall 14 and has an inlet end portion 34a that registers with the interior of the enclosure 10 in communication with the lower portion of the bed 22. The pipe 34 is thus adapted to receive the spent bed material as it migrates downwardly in the bed and functions to discharge the material from the enclosure 10 by gravity to a screw cooler, conveyor belt, or the like (not shown).

A plurality of air distributors, or nozzles, 36 communicate with the perforations of the plate 24 and each is in the form of a vertically disposed tubular member that is secured to the plate in any conventional manner, such as by bolting or welding. The nozzles 36 extend upwardly from the plate 24 for a predetermined distance into the bed 22 and their lower ends receive air from the plenum 26. As a result of the foregoing, the air from the plenum 26 passes through the nozzles 36 and discharges into the bed 22. The air exiting the nozzles 36 provides for combustion of the fuel in bed 22 and causes the bed 22 to become fluidized. Combustion gases then exit through the top of chamber 10. Also, a dormant layer of particulate material is formed around the vertical portions of the nozzles 36 which acts to insulate the plate 24 from the heat generated in the heat exchanger extending above the nozzles 36.

A pair of pipes 40 and 42 are provided for introducing particulate material into the bed 22. The pipes 40 and 42 extend from an area outside the enclosure adjacent the upper portion of the rear wall 14, through the latter wall at a slight angle to the horizontal and then vertically through the bed 22 where they terminate above the plane of the discharge ends of the nozzles 36. The end portions of the pipes 40 and 42 located externally of the enclosure 10 are adapted to receive pressurized gas, such as air or flue gas, from an external source (not shown) which pneumatically transports the particulate material through the pipes. A pair of feed pipes 44 and 46 are provided which register with the pipes 40 and 42, respectively, and are adapted to introduce the particulate material into the latter pipes under control of valves 48 and 50, respectively, disposed in the pipes 44 and 46.

The particulate material introduced into each pipe 40 and 42 from the feed pipes 44 and 46, respectively, may be crushed coal or a mixture of crush coal and an adsorbent, such as limestone, for the sulfur generated as a result of the combustion of the coal. Alternatively, crushed coal from the feed pipe 44 could be introduced into the pipe 40 and the adsorbent could be introduced from the feed pipe 46 into the pipe 42.

The ratio of the particulate material to the air in each pipe 40 and 42 is regulated so that the particulate material is suspended in the air as it passes through the latter pipes before being discharged into the bed 22 slightly above the nozzles 36.

A pair of generally convex deflectors 50 and 52 are mounted to the plate 24 in any conventional manner and are located directly below the discharge ends of the pipes 40 and 42, respectively, in the path of the mixture of particulate materials and air as it discharges from the latter pipes. The deflectors 50 and 52 are shaped in the manner shown to deflect the mixture in the direction shown by the flow arrows in FIG. 1 which promotes diffusion and circulation of the particulate material in the bed.

A pair of auxiliary air pipes 54 and 56 extend through the plenum 26 and register with enlarged openings formed in the plate 24 below the deflectors 50 and 52 respectively. The pipes 54 and 56 are connected to a source of air (not shown) and have dampers 58 and 60 respectively disposed therein for controlling the flow of the air through the pipes. As shown in FIG. 1, a plurality of openings are formed through the deflectors which extend in a substantially horizontal direction to allow the air from the pipes 54 and 56 to discharge into the bed 22.

The flow of fluidizing air from the nozzles 36, transport gas from the pipes 40 and 42, and air from the deflectors 50 and 52 is controlled by design of the various components and by regulation of the dampers 30, 58 and 60 to cause a zone of the bed 22 immediately above the outlets of feed pipes 40 and 42 to have less total air per unit area than the surrounding bed portions. Thus, a relative dense column of particulate material is formed immediately above the outlets of the feed pipes 40 and 42 causing an enhanced circulation of bed material downwardly along the lower portions of the feed pipes and an enhanced distribution of the material laterally from the feed pipe outlets at the lower level of the bed 22. As a result, a momentum is imparted to the bed material which induces a diffusion and circulation of the material in the bed and thus insures superior distribution and mixing of the particulate material.

A bed light-off burner 62 is provided through the front wall 12 immediately above the plate 24 for initially lighting off the bed during startup in a conventional manner, and a pair of horizontal headers 64 are connected in fluid communication with the tubes 18 forming the front wall 12 and the rear wall 14, respectively, and another pair of horizontal headers 66 are connected in fluid communication with the tubes 18 forming the sidewall 16. It is understood that headers similar to the headers 64 and 66 are provided in communication with both ends of the sidewall 17 and the upper ends of the walls 12, 14 and 16. As a result, a fluid to be heated can be sequentially or simultaneously passed through the walls 12, 14, 16 and 17 to pick up the heat from the fluidized bed in a conventional manner.

In operation, the damper 30 associated with the air plenum 26 is opened and pressurized air passes up through the plenum and into the inlet ends of the nozzles 36. The air flows upwardly through the nozzles 36 before discharging into the bed 22 at a plane above the plane of the plate 24. Thus, that portion of the particulate material in the bed 22 extending immediately above the nozzles 36 is fluidized while the portion extending between the latter ends and the upper surface of the plate 24 remains dormant, or stagnant.

The light-off burner 62 is then fired to heat the material in the bed until the temperature of the material reaches a predetermined level, and additional particulate fuel and adsorbent material is discharged onto the upper surface of the bed 22 through the pipes 40 and 42 where it is deflected into the bed in the manner discussed above. Auxiliary air from the pipes 54 and 56 is discharged into the interior of the deflectors 50 and 52 and is directed into the bed 22 in a general horizontal direction.

After the bed 22 has reached a predetermined elevated temperature in accordance with the foregoing, the light-off burner 62 is turned off while the pipes 40 and 42 continue to distribute particulate material to the upper surface of the bed in accordance with predetermined feed rates to replenish the material lost in the combustion process and discharged from the drain pipe 34. As a result of the foregoing, an improved mixing, distribution and diffusion of the particulate material is achieved due to the momentum imparted to the bed material and the improved circulation of the latter within the bed. Also, the dormant layer of particular material extending between the upper surface of the plate 24 and the nozzles 36 acts as an insulator for the plate.

Fluid, such as water, to be heated is passed into the headers 64 and 66 where it passes simultaneously, or in sequence, through the tubes 18 forming the walls 12, 14, 16 and 17 to add heat from the fluidized bed to the fluid before it is passed to external apparatus for further processing.

Figure 4:
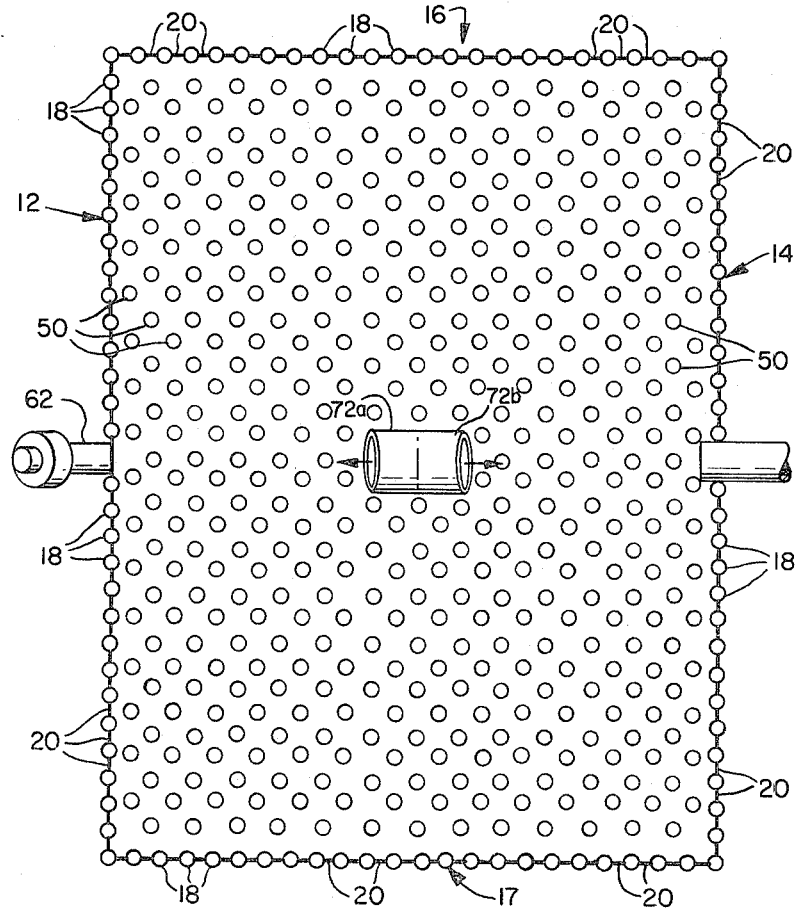
FIG. 4 is a view similar to FIG. 2, but depicting the embodiment of FIG. 3.
Figure 3:
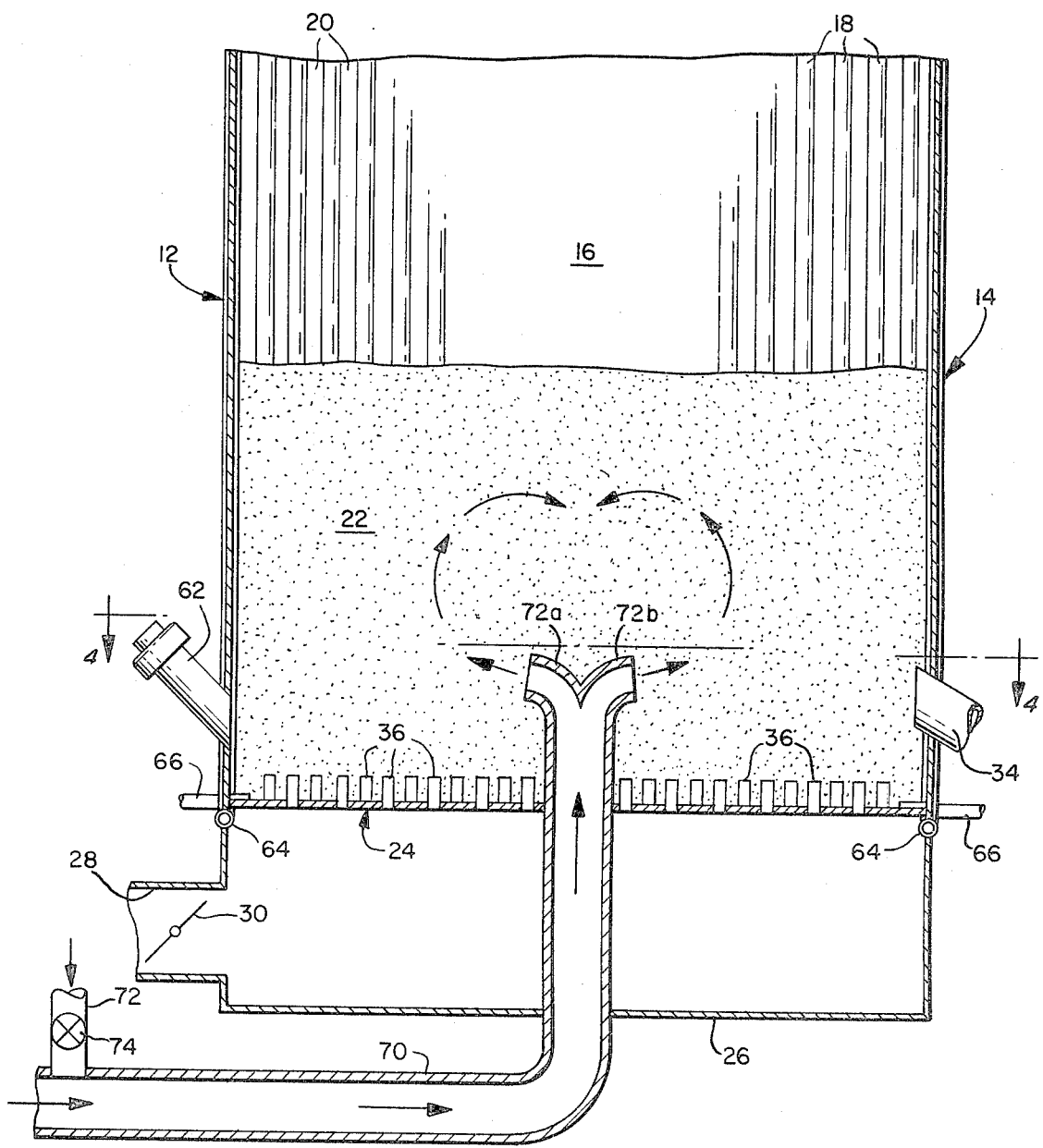
FIG. 3 is a view similar to FIG. 1 but depicting an alternate embodiment of the fluidized bed heat exchanger of the present invention.

The embodiment of FIGS. 3 and 4 is similar to that of the embodiment of FIGS. 1 and 2, and identical components have been given the same reference numerals. According to the embodiment of FIGS. 3 and 4, a centrally located feed pipe 70 has a horizontal portion which extends below the air plenum 26 and a vertical portion which extends through the air plenum 26. The end portion of the vertical portion of the feed pipe 70 extends through, and projects slightly upwardly from, an enlarged opening formed in the plate 24, and is split into two angularly-extending discharge portions 70a and 70b directed generally towards the walls 12 and 14 respectively.

As can be better appreciated from FIG. 4, the discharge portions 70a and 70b are disposed midway between the walls 12 and 14 and midway between the walls 16 and 17, and thus are located in the central portion of the plate 24.

A feed pipe 72 is provided which registers with the pipe 70 and is adapted to introduce particulate fuel material into the latter pipe under the control of a valve 74. The particulate material thus mixes with the air in the pipe 70 in a manner similar to that discussed in connection with the previous embodiment. If it is also desired to introduce an adsorbent material into the bed, the latter material can be introduced either along with the fuel material in the pipe 72 or by a separate feeder system (not shown).

The particulate material/air ratio in the pipe 70 is regulated so that the particulate material is suspended in the air as it passes through the latter pipe before being discharged into the bed 22 from the discharge portions 70a and 70b.

Therefore, according to this embodiment, an improved mixing, distribution and diffusion of the particulate material in the bed 22 is also achieved as a result of the momentum imparted to the material and the improved circulation of the material within the bed, in a manner similar to that of the previous embodiment.

It is understood that variations in the above arrangements can be made without departing from the scope of the invention. For example, the nozzles can take a different configuration from that discussed above, and the number and specific locations of the nozzles and the feed pipes as well as their specific orientation can be varied as long as the above objectives and results are achieved. Also, a bank, or series, of heat exchange tubes can be provided in the enclosure 10 for circulating water in a heat exchange relationship with the bed 22 in a conventional manner.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A fluidized bed heat exchanger comprising a perforated plate adapted to support a bed of particulate material, means for introducing air through said perforations to fluidize said particulate material, at least one feeder pipe having a substantially vertical portion which extends from an area above said bed into said bed for introducing a mixture of air and additional particulate material into said bed, means disposed immediately below said feeder pipe and in the path of said mixture as it discharges from said feeder pipe for deflecting said mixture in a substantially horizontal direction laterally across said bed, and means for introducing additional air into said deflecting means, said deflecting means including means for discharging said latter air into said bed in a substantially horizontal direction laterally across said bed, said means for introducing said mixture, said means for introducing said air, and said means for introducing said additional air being adapted to be controlled so that a relative dense column of particulate material is formed at said bed portion to induce circulation of the material downwardly and laterally across said bed.

2. The heat exchanger of claim 1 wherein said deflecting means includes at least one deflector supported by said plate.

3. The heat exchanger of claim 1 wherein there are two feeder pipes and two deflectors respectively associated with said feeder pipes.

4. The heat exchanger of claim 1 wherein said means for introducing said additional air comprises a pipe connected at one end to a source of said auxiliary air to a point external of said bed, said pipe extending into said bed in a substantially vertical direction.

* * * * *

UNITED STATES PATENT AND TRADEMARK OFFICE
CERTIFICATE OF CORRECTION

PATENT NO. : 4,404,755
DATED : September 20, 1983
INVENTOR(S) : Robert D. Stewart and Robert L. Gamble It is certified that error appears in the above-identified patent and that said Letters Patent are hereby corrected as shown below:

Claim 1, line 8 (corresponding to column 6, line 18) after "into" add --at least one portion of-- and claim 1, line 16 (corresponding to column 6, line 26) delete "means for introducing said mixture" and insert "feeder pipe".

Signed and Sealed this

Thirty-first Day of January 1984

[SEAL]

Attest:

GERALD J. MOSSINGHOFF

Attesting Officer

Commissioner of Patents and Trademarks